(12) United States Patent
Ohkawa

(10) Patent No.: US 6,609,809 B2
(45) Date of Patent: Aug. 26, 2003

(54) GUIDE PLATE, SURFACE LIGHT SOURCE DEVICE AND LIQUID CRYSTAL DISPLAY

(75) Inventor: Shingo Ohkawa, Yoshikawa (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 10/091,408

(22) Filed: Mar. 7, 2002

(65) Prior Publication Data

US 2002/0145686 A1 Oct. 10, 2002

(30) Foreign Application Priority Data

Mar. 29, 2001 (JP) ........................ 2001-096936

(51) Int. Cl.[7] ................................. F21V 8/00
(52) U.S. Cl. ........................................ 362/31
(58) Field of Search ................... 362/31, 561

(56) References Cited

U.S. PATENT DOCUMENTS

| | | | | |
|---|---|---|---|---|
| 5,921,651 A | * | 7/1999 | Ishikawa | 362/31 |
| 6,036,327 A | * | 3/2000 | Blonder et al. | 362/31 |
| 6,123,431 A | * | 9/2000 | Teragaki et al. | 362/31 |
| 6,139,163 A | * | 10/2000 | Satoh et al. | 362/31 |
| 6,454,452 B1 | * | 9/2002 | Sasagawa et al. | 362/561 |
| 6,485,157 B2 | * | 11/2002 | Ohkawa | 362/31 |
| 6,522,373 B1 | * | 2/2003 | Hira et al. | 362/31 X |

* cited by examiner

*Primary Examiner*—Laura K. Tso
(74) *Attorney, Agent, or Firm*—Staas & Halsey LLP

(57) ABSTRACT

A surface light source device and LCD employing light guide plates having inconspicuous micro-reflector arrays are provided. A light guide plate 30 illuminating an LCD panel of a surface light source device has a back face 32 provided with many micro-reflectors 20 arranged with sidewise intervals on imaginary lines Ki which are generally perpendicular to an imaginary reference line S with longitudinal intervals getting smaller according to an increasing distance from an incidence face 33. On each imaginary line Ki, the sidewise intervals get smaller or micro-reflector sizes get larger according to an increasing distance from the reference line S. Making many microreflector trios each of which consists of micro-reflectors arranged adjacent to each other and on any imaginary lines Ki to Ki+2, each of the trios has micro-reflectors are located generally on a straight line. Covering rate of the micro-reflectors increases according to an increasing distance from an incidence face 33. The imaginary lines Ki may be curved gently.

18 Claims, 10 Drawing Sheets

PORTION A ENLARGED

PORTION B ENLARGED

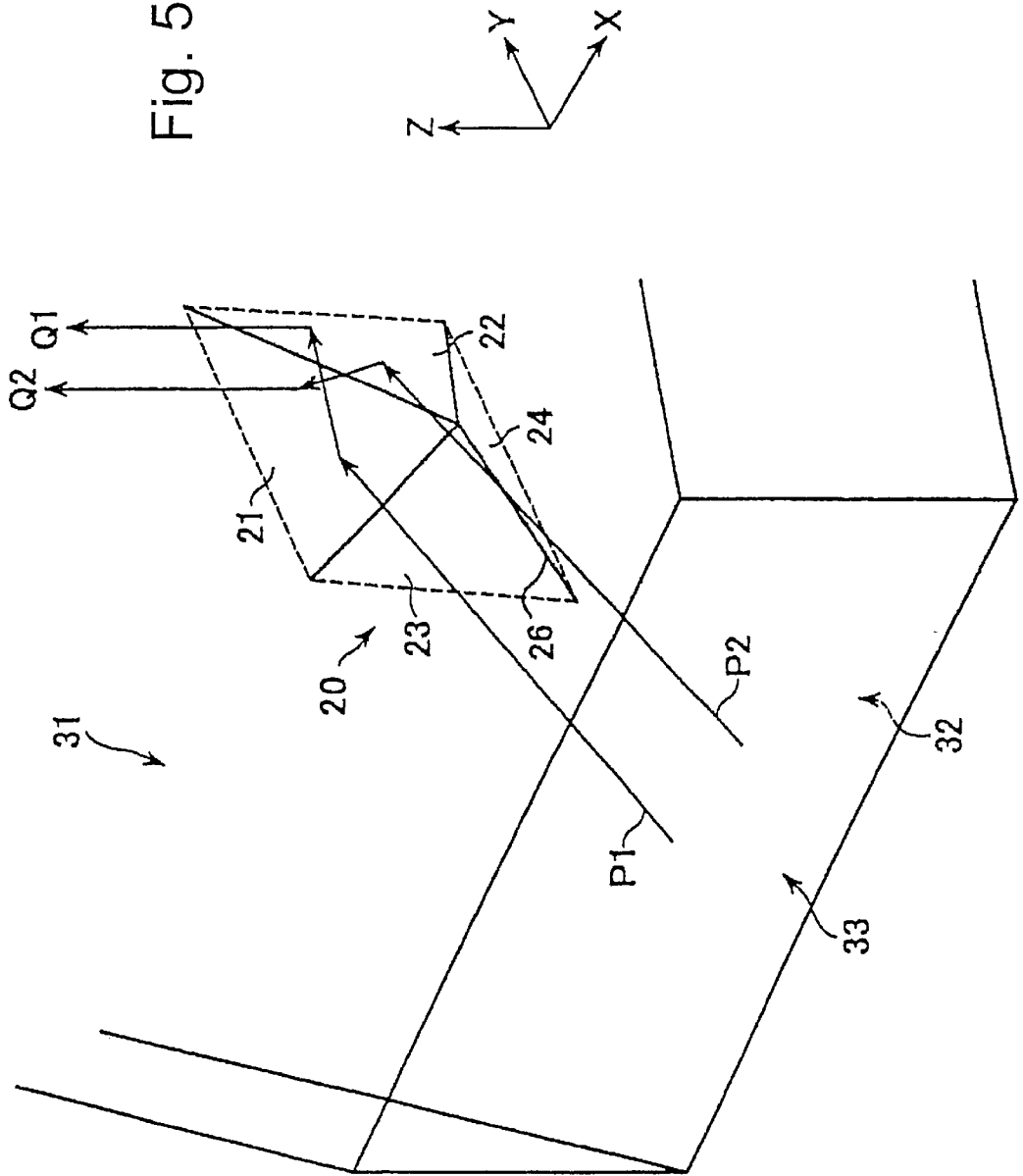

Fig. 8a
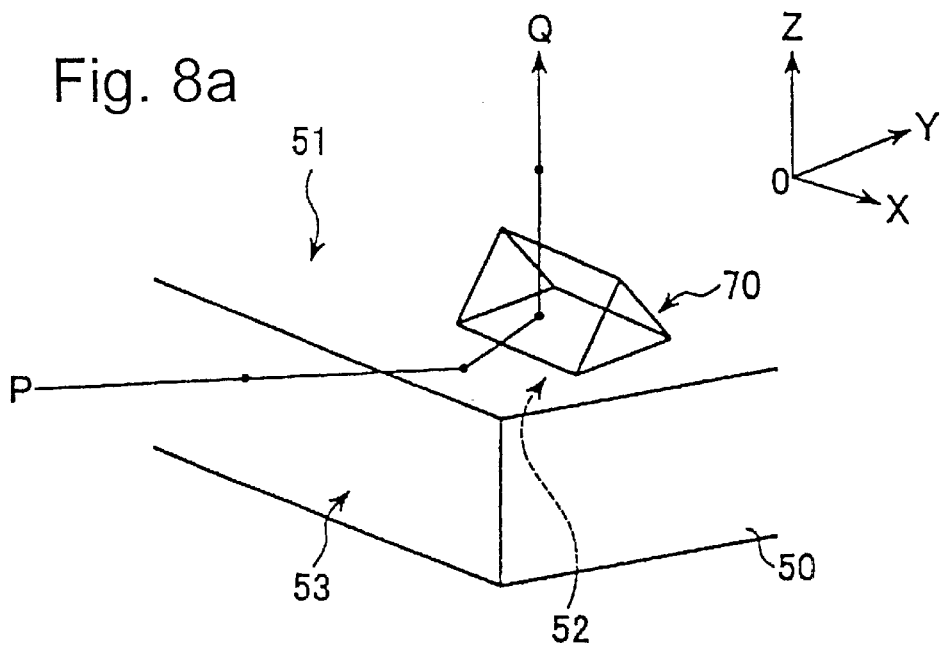
Fig. 8b
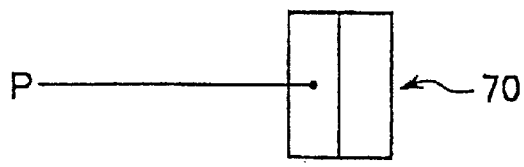
Fig. 8c
Fig. 8d
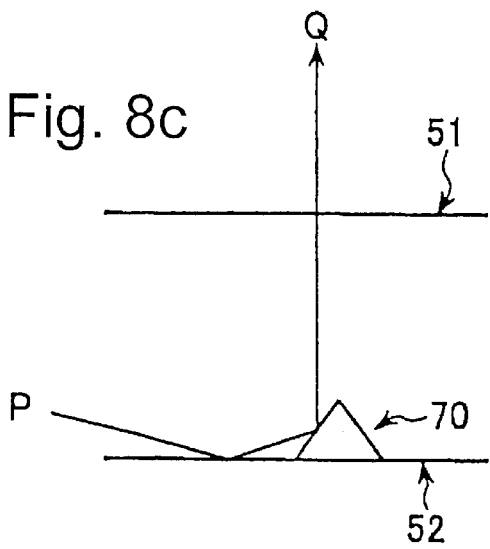
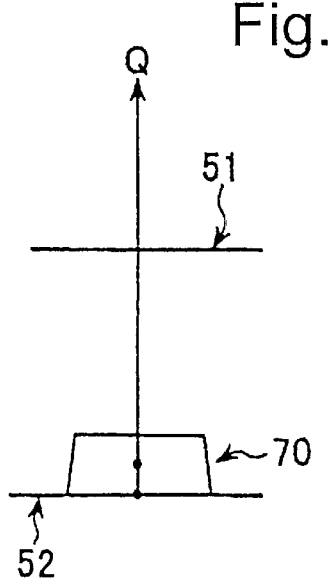

GUIDE PLATE, SURFACE LIGHT SOURCE DEVICE AND LIQUID CRYSTAL DISPLAY

BACKGROUND

1. Field of Invention

The present invention relates to a light guide plate, surface light source device and liquid crystal display, in particular to improvements of a light guide plate having a back face provided with a great number of micro-reflectors, a surface light source device employing an improved light guide plate and a liquid crystal display employing the surface light source device for illumination a liquid crystal display panel. The present invention is applied to liquid crystal displays for portable telephones, personal computers or car-navigation systems, being applied further to surface light source devices and light guide plates used therein.

2. Related Art

According to a well-known prior art, a surface light source device has a light guide plate which is supplied with light sideways and outputs the light through an emission face after introducing the light into the light guide plate and applying direction-conversion, being broadly employed for illuminating an LCD panel or other uses. Although rod-like fluorescent lamps (cold cathode tubes) have been used broadly as primary light sources, those using point-like light sources such as LEDs (Light Emitting Diodes) tend to be employed recently.

In such surface light source devices, light guide plates are in charge of light-direction-conversion because the light guide plates are supplied light sideways. As known well, light-direction-conversion within light guide plates and promotion of emission from an emission face can be performed by employing light guide plates made of light scattering-guiding material, or by applying emission promoting processing such as making a back face or emission face light-diffusible.

However, as known well, such means causes the emitted light to be preferentially directed to a much inclined forward (Oblique emission directivity of light guide plate). Such greatly inclined output directions are much quite different from usually desired output directions.

According to a prior proposition to realize a direction-conversion capable of providing a preferential output direction which is desired, a great number of micro-reflectors are formed on a back face of a light guide plate. The micro-reflectors on the back face of the light guide plate proposed are shaped like a great number of micro-projections or micro-dents, which generate an inner propagation light proceeding toward an emission face by means of an inner-face reflection of them. This inner propagation light is emitted from the emission face, becoming an output light. The preferential output direction is controllable in a remarkable range within which a frontal direction falls, through design of shapes or postures of the micro-reflectors. FIGS. 1a, 1b, 2a and 2b show an example in which a surface light source device employing a light guide plate provided with micro-reflectors as mentioned above for illumination a liquid crystal display panel.

FIG. 1a is a plan view of an outlined arrangement viewing from the back side of the light guide plate, and FIG. 1b is a side view from the left side in FIG. 1a.

FIGS. 2a and 2b illustrate an arrangement of micro-reflector 20 in a prior art, FIG. 2a showing in and around circled portion A, FIG. 2b showing in and around circled portion B.

In the first place, referring to FIGS. 1a and 1b, an incidence face 12 is provided by a side end face of a light guide plate 10 made of a transparent material such as acrylic resin or polycarbonate (PC). A rod-like primary light source (cold cathode tube) L1 is disposed along the incidence face 12 which is supplied with light from the primary light source. The light guide plate 10 has major faces 213 and 14 one of which provides an emission face 13. The other face (back face) 14 is provided with a great number of micro-reflectors 20 shaped like micro-projections.

A well-known liquid crystal display panel PL is disposed on the outside of the emission face 13 to provide a liquid crystal display of backlighting type. It is noted that size values are merely examples, being indicated in mm.

The primary light source L1 emits light, which is introduced into the light guide plate 10 through the incidence face 12. An inner propagation light travels within the light guide plate 10 and undergoes direction-conversion when entering into micro-reflectors 20 on being inner-reflected by inner faces of projections, with the result that light proceeding toward the emission face 13 is produced. Such inner reflection occurs once or twice depending on configuration of the micro-reflectors 20 (See concrete examples in embodiments described later).

The example of arrangement of micro-reflectors 20 shown in FIGS. 2a and 2b is determined as to meet the following conditions.

(1) Micro-reflectors 20 are arrayed with sidewise intervals on many imaginary lines drawn approximately in parallel with the incidence face 12. It is noted that the term "imaginary line" in the instant specification means line that is imaginatively drawn to determine or describe micro-reflector arrangement.

In FIGS. 2a and 2b, the imaginary lines are represented by the i-th, i+1-th, j-th and j+1-th imaginary lines in order from the side of the incidence face 12, Gi, Gi+1, Gj and Gj+1.

(2) Longitudinal intervals between imaginary lines Gi and Gi+1 (i=1, 2, 3 ... j, j+1 ... in the same manner hereafter) adjacent to each other get narrower according to an increasing distance from the incidence face 12.

In the illustrated example, 79 $\mu$m and 58 $\mu$m is set in and around circled portion A (near to the incidence face 12) and circled portion B (far from the incidence face 12), respectively (See FIGS. 1a, 1b, 2a and 2b).

(3) Sidewise intervals of many micro-reflectors 20 on each imaginary line Gi are constant. This is defined as di.

(4) Mutual sideway interval di on imaginary line Gi gets smaller according to an increasing distance from the incidence face 12. In the illustrated example, 79 $\mu$m is set in the vicinity as shown in FIG. 2a (circled portion A) of the incidence face 12 and 58 $\mu$m is set in a distant portion (circled portion B as shown in FIG. 2b far from the incidence face 12. In other words, sideway interval is equal to longitudinal interval between successive imaginary lines at each portion correspondingly.

As a natural result derived from these conditions (1) to (4), micro-reflectors 20 are arranged as to get denser according to an increasing distance from the incidence face 12 regarding both directions, sidewise direction (parallel with imaginary line Gi) and longitudinal direction (perpendicular to imaginary line Gi). Such variations in arraying density (more generally expressing, covering rate) of micro-reflectors enables the emission face 13 to provide a uniformalized brightness (emission face intensity).

OBJECT AND SUMMARY OF INVENTION

Cases where a great number of micro-reflectors are formed on a back face of a light guide plate as described above are subject to a problem that the micro-reflector arrangement is apt to be visible through the light guide plate. A sample prepared according to the above example of arrangement (FIGS. 2a and 2b) was found fairly visible.

This problem is relaxed to some degree by reducing size of individual micro-reflectors. However, size reduction is subject to a practical limit. According to another technique, a light diffusion plate having a strong diffusibility is disposed on an emission face, which brings loss of light. Beside, it is not preferable that an arrangement of light diffusion late is indispensable, viewing from According to another idea, it is attempted that micro-reflectors are arranged as randomly as possible in order to avoid the arranged micro-reflectors from being conspicuous. However, if this idea is applied, local pattern rather appears, which is probably caused by "fluctuation of arranging rate", failing to provide good results.

Thus an object of the present invention is to provide a light guide plate improved so that the above-mentioned micro-reflector arrangement is inconspicuous, and to provide a surface light source device improved by employing the light guide plate and a liquid crystal display improved by employing the surface light source device.

According to the present invention, an inconspicuous micro-reflector arrangement is obtained by requiring micro-reflectors formed on a back face of a light guide plate to meet a certain conditions. That is, the present invention provides a light guide plate having a back face provided with an inconspicuous micro-reflector arrangement, a surface light source device employing the light guide plate and a liquid crystal display employing the surface light source device.

In the first place, the present invention is applied to a light guide plate supplied with light from a primary light source, comprising an emission face for light-outputting, a back face opposite with the emission face and an incidence face for light-inputting.

The back face is provided with a great number of micro-reflectors for light-proceeding-direction-conversion, which are arranged as to meet the following conditions.

Condition 1; The great number of micro-reflectors are arranged with sidewise intervals on many imaginary lines K1, K2, K3 . . . which are separated with longitudinal intervals to each other and extend in directions generally perpendicular with respect to an imaginary reference line S that extends as to leave the incidence face.

Condition 2; Covering rate of the micro-reflectors on the back face per unit area tends to increase according to an increasing distance from the imaginary reference line S.

Condition 3; When many micro-reflector trios are imaginatively composed of micro-reflectors arranged on successive three imaginary lines Ki, Ki+1, Ki+2 (i=1, 2, 3, 4 . . . ) so that each micro-reflector trio consists of three micro-reflectors which are located adjacent to each other and picked up one by one from every imaginary line Ki, Ki+1, Ki+2 and further so that each of approximately all of the micro-reflectors belong to only three trios of the many trios, the three micro-reflectors belonging to each of the many micro-reflector trios are located approximately on a straight line.

Condition 4; Covering rate of the micro-reflectors on the back face per unit area tends to increase according to an increasing distance from the incidence face.

Condition 2, which is important particularly, enables the micro-reflector arrangement to be inconspicuous in combination with the other Conditions 1 and 3. That is, the above-mentioned prior art example does not meet Conditions 2 while meeting Conditions 1, 3 and 4.

In other words, the above-mentioned prior art example (FIGS. 2a and 2b) shows that many micro-reflectors 20 are arranged with a constant mutual sidewise interval di on each imaginary line Gi.

As a result, even if an arrangement of micro-reflectors 20 on imaginary lines Gi and Gi+1 adjacent to each other are designed as to not align longitudinally, it is inevitable that oblique aligning lines, which extend approximately in parallel at a "constant sidewise interval" (for example, sidewise interval between Hk and Hk+1=sidewise interval between Hk+1 and Hk+2) with each other in a considerable length range, are produced in a wide area (generally across the whole width of the light guide plate).

It is noted that covering rate does not vary along a direction of toe width of the light guide plate because the micro-reflectors 20 are the same in size.

According to researches by the instant inventor, if such "regularity of repeated arrangement of equal-sized micro-reflectors with sidewise interval" exists in a large area, conspicuous stripe-like pattern is apt to appear.

To the contrary, according to the present invention, although "oblique aligning lines" are produced, sidewise intervals of the "oblique aligning lines" vary depending on an increasing sidewise distance from an imaginary standard line by requiring Condition 2, as described later (See FIG. 4 described later). Alternately, covering rate may be varied by increasing micro-reflector size according to an increasing sidewise distance from an imaginary standard line.

In such ways, "regularity of repeated arrangement of equal-sized micro-reflectors with sidewise interval" is avoided from existing in a large area, with the result conspicuous stripe-like pattern is prevented from appearing.

It is noted that configurations of micro-reflectors are not limited in particular so far as their functions are maintained, in other words, so far as an inner propagation light proceeding toward an emission face is produced by inner reflection.

Typical configurations of micro-reflectors include quadrangle pyramids, cylindrical dents and V-shaped dents (laid triangular poles). Concrete examples of configurations and arrangements of micro-reflectors employed in the present invention are described in embodiments later.

According to a preferable embodiment, an incidence face is set at a corner portion of a light guide plate. Light supply from a corner portion avoid any corner portion from receiving uniquely weak light, being highly suitable for micro-reflector arrangements as employed in the present invention.

The present invention is applied to a surface light source device comprising a primary light source and a light guide plate which introduces light through an incidence face to emit light through an emission face, wherein the light guide plate is one improved as above. The employed light guide plate provided with an inconspicuous micro-reflector arrangement causes the surface light source device to provide an improved light output quality such that unnatural bright-dark pattern is hardly visible.

In addition, a liquid crystal display showing an improved display quality is provided if the same surface light source device is employed for illuminating a liquid crystal display panel.

BRIEF DESCRIPTION OF DRAWING

FIGS. 1a and 1b illustrate an example of conventional arrangement, FIG. 1a being a plan view from the back side of a light guide plate, FIG. 1b being a side view from the left side in FIG. 1a;

FIG. 5 shows one of the micro-reflectors employed in the embodiment with an enlarged perspective view showing the vicinity of a projection with an illustration of direction conversion of an inner propagation light;

FIGS. 8a through 8c depict one of V-shaped micro-reflectors formed on another modified example of light guide plate to illustrate direction-conversion of inner-propagation light, FIG. 8a being a perspective view, FIG. 8b being a view from +Z-direction, FIG. 8c being a view from +x-direction and FIG. 8d being a view from +Y-direction;

EMBODIMENT

Embodiments in accordance with the present invention are described hereafter by referring to the attached drawings. It should be noted that factors such as size and shape of elements are exaggerated, as required, for the sake of explanation. Further, elements commonly employed in a plurality of drawings, are denoted by common references and repeated descriptions are omitted as required.

Figure 3:
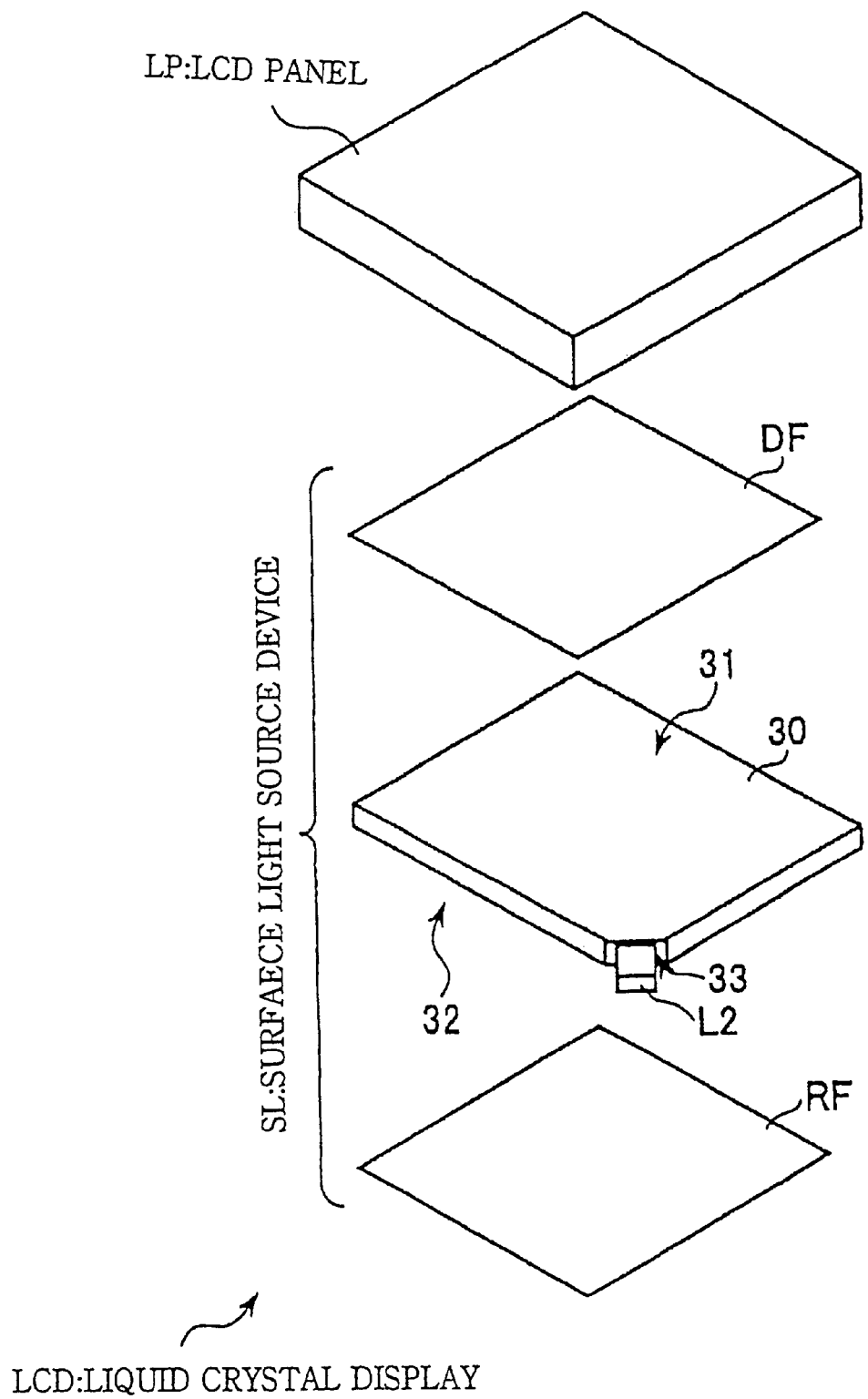
FIG. 3 is an exploded perspective view showing an outlined structure of a liquid crystal display (LCD) of an embodiment in accordance with the present invention.

Referring to FIG. 3, a perspective view of a liquid crystal display LCD of an embodiment in accordance with the present invention is shown. The liquid crystal display LCD is applied to, for instance, portable phones, LCD television sets, mobile-computing devices or the like, being provided with a surface light source device SL backlighting a liquid crystal display panel LP.

The surface light source device SL comprises a light guide plate 3O, primary light source L2, reflection sheet RF and light diffusion sheet DF. The light guide plate 30 is a light-permeable member made of as acrylic resin (PMMA resin) or cycloorefinic resin, having a generally uniform thickness. The light guide plate 30 has major faces, one providing an emission face 31, the other providing a back face 32.

The light guide plate 30 is generally shaped like a rectangle at one corner portion of which an incidence face 33 is set. The incidence face 33 has a configuration that is formed by cutting-off a corner approximately at 45 degrees with respect to two sides meeting at the corner, respectively. The incidence face 33 extends generally at the right angles with respect to the emission face 31 and back face 32.

The reflection sheet RF made of, for instance, a white PET has a function of returning light, which has leaked from the back face 32, thereby preventing loss of light. The light diffusion sheet DF has an extremely weak light diffusibility, almost completely preventing micro-reflectors described later from being conspicuous. The reflection sheet RF and light diffusion sheet DF are sheet members optionally arranged, as required, one or both of them may be omitted.

The primary light source L2 consists of a device adopting one or more LEDs (light Emitting Diode) as light emitter(s), supplying primary light toward the incidence face 33. The device preferably has an emitting directivity such that primary light having some angular extension (such as about 90 degrees) is supplied.

Figure 4:
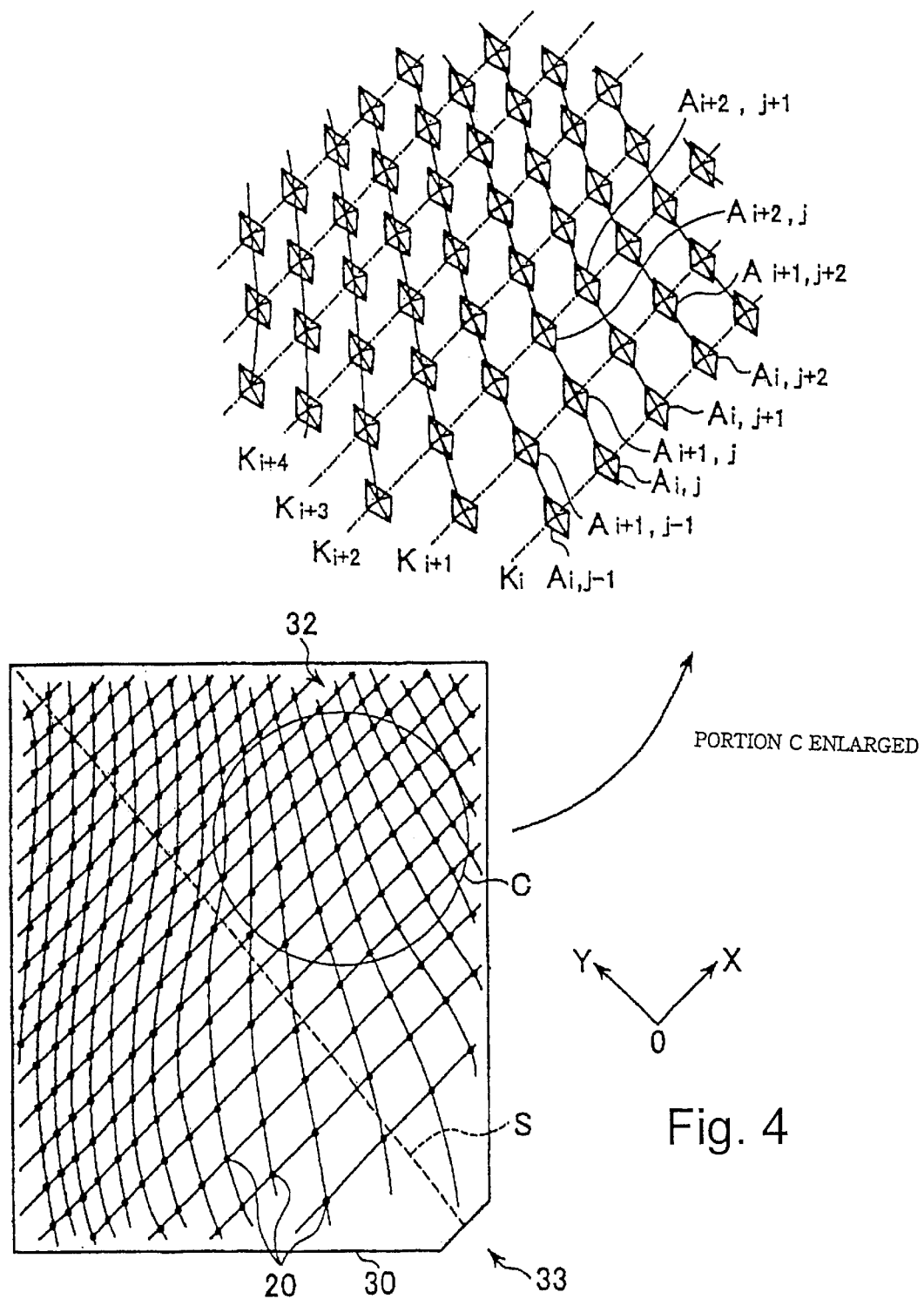
FIG. 4 is an enlarged partial illustration of micro-reflector array in and around circled portion C on the back face of the light guide plate employed in the embodiment.

Referring to FIG. 4, the back face 32 of the light guide plate 30 is shown together with an enlarged partial illustration of circled portion C. As shown as dots in the illustration covering the whole back face at a left-lower part, a great number of micro-reflectors 20 are formed on the back face 32. Each micro-reflector 20 is configured like a projection projecting from a "general plane representing the back face 32". The term "general plane representing the back face 32" means "the back face remaining if the micro-reflectors are imaginatively removed", being also called simply "back face".

The micro-reflectors 20 are arranged according to a certain arrangement rule in accordance with features of the present invention, as described later. The micro-reflectors 20 in the instant example are shaped like quadrangle-pyramids. The quadrangle-pyramid-like micro-reflectors 20 have a function of producing an inner propagation light directed toward the emission face 31 (See FIG. 3) by converting a proceeding direction of light (inner propagation light) which is supplied by the primary light L2 and introduced into the light guide plate 30 through the incidence face 33, through inner reflections.

Configurations and functions of the quadrangle-pyramid-like micro-reflectors 20 are described by referring to FIGS. 5, 6a, 6b and 6c. FIG. 5 shows one of the micro-reflectors 20 with an illustration of direction conversion of an inner propagation light effected by the micro-reflector. In the illustration, the inner propagation light is represented by representative light beams P1 and P2.

Figure 6A:
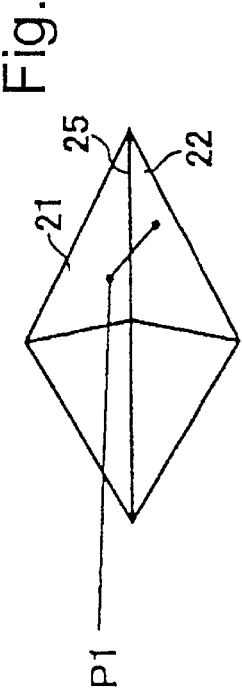
FIGS. 6a through 6c illustrate a path of representing beam P1, shown in FIG. 5 from +Z-direction (FIG. 6a), from +X-direction (FIG. 6b) and from +Y-direction (FIG. 6c), respectively.
Figure 6C:
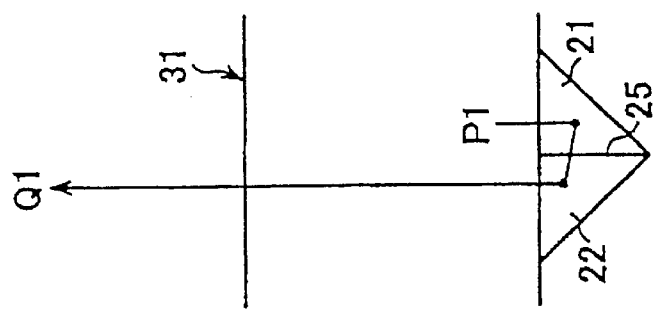
Figure 6B:
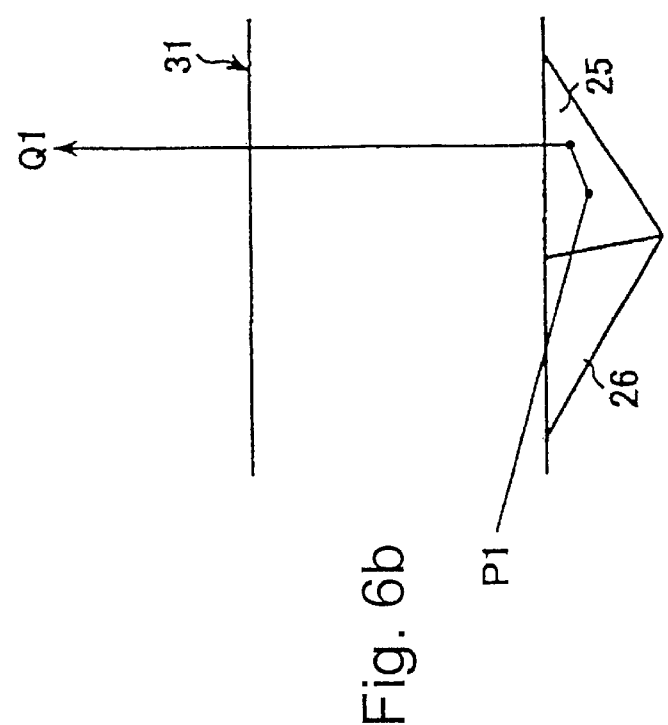

In FIG. 5, coordinate O-XYZ is used to identify directions, matching with O-XY shown in FIG. 4 as to X-axis and Y-axis. A light path of one of the representative light beam P1 is illustrated in FIGS. 6a through 6c from +Z-direction, from +X-direction and from +Y-direction, respectively.

As illustrated in FIG. 5 and others, each micro-reflector 20 has a pair of slopes 21 and 22 located on a side further from the incidence face 33, the slopes providing a first and second inner-reflection faces. A ridge 25 is formed by meeting of both slopes 21, 22 (i.e. inner-reflection faces; the same hereafter). Each micro-reflector 20 has another pair of slopes 23 and 24 located on a side closer to the incidence face 33. A ridge 26 is formed by meeting of both slopes 23, 24.

After all, in this embodiment, each micro-reflector 20 like a quadrangle-pyramid is provided by four slopes. It is noted that foot lines (inter sections with the back face) of the projection is shown by dotted lines.

Viewing from the standpoint of light propagating within the light guide plate 30, the micro-reflectors 20 provide dents inside. The dents include valleys formed by the slopes 21, 22 and valleys formed by the slopes 23, 24. Representative light beams P1 and P2 shown in FIG. 5 represent an inner propagation light which approaches the micro-reflector 20 from the incidence face 33 set at the corner portion.

Light beams P1, P2 reach one of the slopes 21 or 22 of the micro-reflector 20 directly from the incidence face 33 or after undergoing an inner reflection(s) at the emission face 31 or back face 32. It is noted that some light might be directed to the slope 21 or 22 after being inner-reflected at the slope 23 or 24.

Much of light reaching the slope 21 or 22 is inner-reflected by the slope 21 and then by the slope 22, or by the slope 22 and then by the slope 21, with the result that an inner propagation light proceeding toward the emission face 31 is produced. This light is emitted from the emission face 31 to provide output light Q1, Q2 of the light guide plate 30, Such behavior of light will be understood better from FIGS. 6a, 6b and 6c illustrating the light path of representative light beam P1 from three directions.

Each micro-reflector 20 is orientated so that the slopes 21 and 22 provide a valley which is opened toward the incidence face 33. If an orientation of each micro-reflector 20 is represented by the ridge 25, it can be said that the ridge 25 is directed to the incidence face 33. Manners of such orientation are shown in a partial enlarged illustration at a right-top part of FIG. 4. If such orientation manners are applied to a great number of micro-reflectors 20, the light supplied by the primary light source L2 is advantageously and efficiently direction-converted as to be emitted.

In the next place, the arrangement of the micro-reflectors 20 are described by referring to FIG. 4 mainly. The arrangement of the micro-reflectors 20 shall meet the conditions mentioned in the column of "Means for resolving the problem". It is noted that the following Conditions 2-1 and 4-1 are selected for Conditions 2 and 4, respectively. Considering the illustration of FIG. 4, the conditions are as follows.

Condition 1; The great number of micro-reflectors 20 are arranged with sidewise intervals on many imaginary lines K1, K2, K3 . . . which are separated with longitudinal intervals to each other and extend in directions generally perpendicular with respect to an imaginary reference line S that extends as to leave the incidence face 33.

Condition 2-1; Covering rate of the micro-reflectors on the back face per unit area tends to increase according to an increasing distance from the imaginary reference line S. For this, sidewise intervals of micro-reflectors tend to get smaller, on each imaginary line Ki, according to an increasing distance from the imaginary reference line S.

Condition 3; When many micro-reflector trios are imaginatively composed of micro-reflectors arranged on successive three imaginary lines Ki, Ki+1, Ki+2 (i=1, 2, 3, 4 . . . ) so that each micro-reflector trio consists of three micro-reflectors which are located adjacent to each other and picked up one by one from every imaginary line Ki, Ki+1, Ki+2 and further so that each of approximately all of the micro-reflectors belong to only three trios of the many trios, the three micro-reflectors belonging to each of the many micro-reflector trios are located approximately on a straight line.

Condition 4-1; Covering rate of the micro-reflectors on the back face per unit area tends to increase according to an increasing distance from the incidence face. For this, longitudinal intervals between successive imaginary lines Ki and Ki+1 tend to get smaller according to an increasing distance from the incidence face of the light guide plate.

Regarding Condition 3, additionally described by referring to a partially enlarged illustration in the upper right part of FIG. 4 as below.

In the partially enlarged illustration, for the sake of convenience, label Ai,j is put on a micro-reflector 20, adopted as a reference micro-reflector, which is located on the i-th imaginary line Ki and at the j-th position counting from the reference line S toward the right-handed direction in FIG. 4, and labels Ai+1,j, Ai,j+1, Ai+1,j+1, Ai+2,j, Ai+2,j+1 ,Ai+2,j+2 . . . are put in order with respect to the reference micro-reflector Ai,j as illustrated.

And, trios as many as possible are imaginatively set such that each trio consists of three micro-reflectors having labels respectively including one common suffix for "j" and three successive suffixes for "i".

If each of generally all of the micro-reflectors, except for a very small number of exceptional micro-reflectors located in the vicinity of edges of the light guide plate 30, belongs to only three trios of the above many trios, the arrangement shown in FIG. 4 can be featured by that every set of three micro-reflectors Ap,q, Ap+1,q, Ap+2,q belonging to any trio are located approximately on a straight line.

This Condition 3 is applied together with Conditions 1, 2 (or 2-1) and 4 (or 4-1), providing a distribution of micro-reflectors 20 according to a curved-grid pattern having intervals varying gradually in both directions along the reference line S and crossing the same.

Figure 2A:
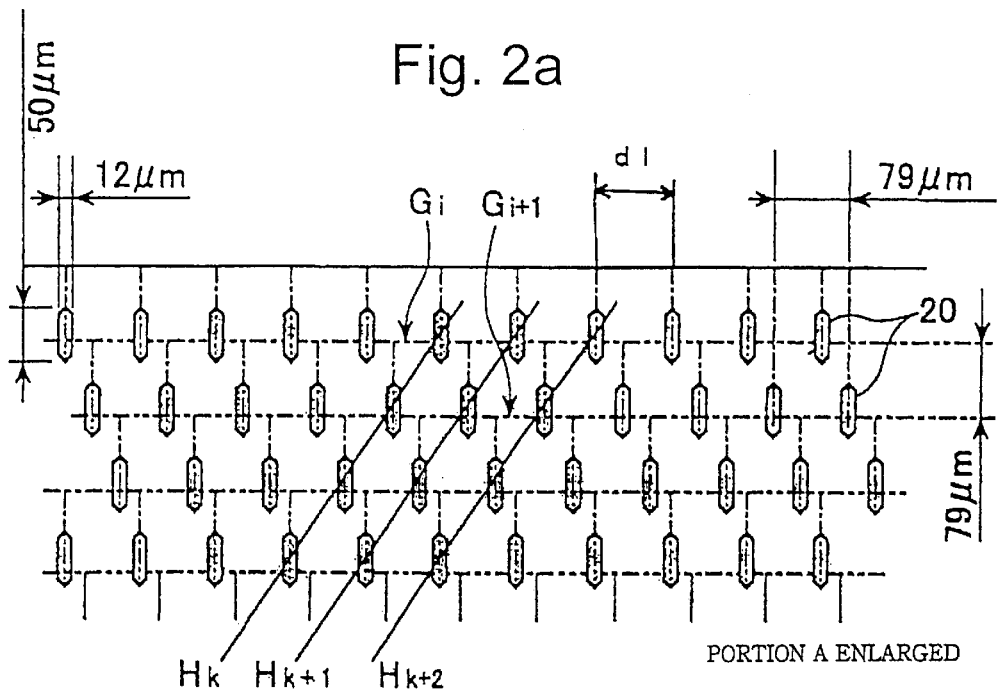
FIGS. 2a and 2b are partial illustrations of micro-reflector arrays in and around circled potion A (FIG. 2a) and circled potion B (FIG. 2b), respectively, on the back face of the light guide plate employed in the liquid crystal display shown in FIGS. 1a and 1b.
Figure 2B:
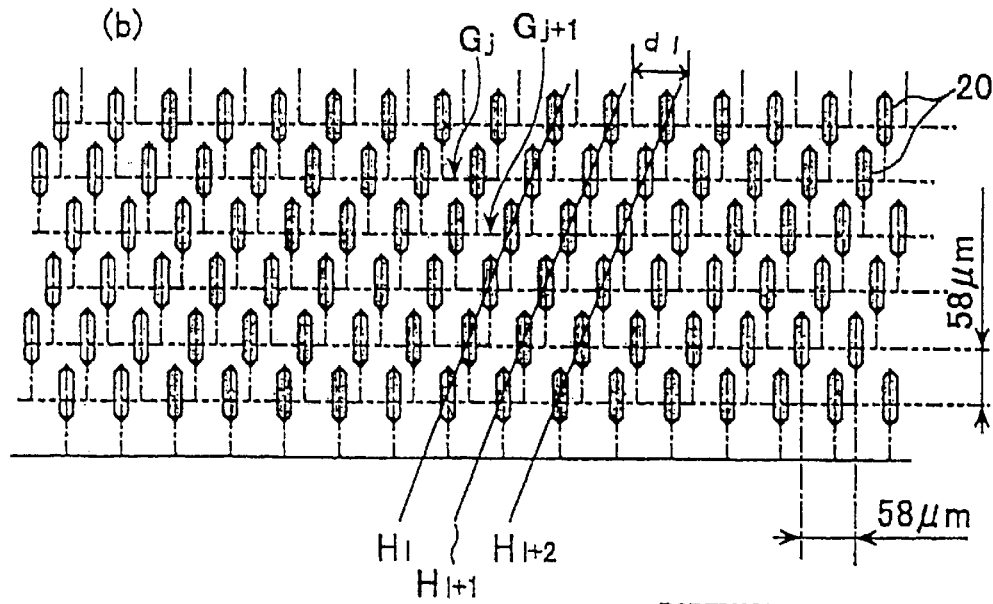

It is specifically important in comparison with the prior art (See FIG. 2) particular that Condition 2 (or 2-1) enables the micro-reflector arrangement to be inconspicuous in combination with the other Conditions 1, 3 and 4.

As fore-mentioned, the above-mentioned prior art example does not meet Conditions 2 (or 2-1) while meeting Conditions 1, 3 and 4.

As a result, the prior art (See FIGS. 2a and 2b) can not provide a "curved-grid pattern having intervals varying gradually in both directions extending from the incidence face (Note: corresponding to the reference line S in FIG. 4) and crossing the same.

In other words, it is inevitable as mentioned previously that oblique aligning lines, which extend approximately in parallel at a "constant sidewise interval" with each other in a considerable wide area (generally across the width of the light guide plate).

According to researches by the instant inventor, if such "regularity of repeated arrangement of equal-sized micro-reflectors with sidewise interval" exists in a large area, conspicuous stripe-like pattern is apt to appear.

To the contrary, in the case of this embodiment provided with a feature of the present invention, although "oblique aligning lines" (lines drawn to trace micro-reflectors having the same suffix j) are produced, intervals between the "oblique aligning lines" vary gradually according to an increasing distance from the imaginary reference line S because the above Condition 2 (2-1) is required.

Thus "regularity of repetition of constant size and constant interval" is avoided from extending over a wide area, with the result stripe-like pattern is prevented from being conspicuous.

It should be noted that shapes of micro-reflectors are not subject to particular limitation so far as a function of inner reflection is effected and an inner propagation light proceeding toward an emission face is produced. Typical shapes of micro-reflectors include, in addition to quadrangle-pyramids described in the above embodiment, shapes like cylindrical-dents and V-shaped dents (laid triangular pole dents).

For these modifications, manners of direction-conversion are illustrated in FIGS. 7a to 7d and 8a to 8d in a way of illustration similar to that of FIGS. 6a to 6c.

In the first place, referring to FIGS. 7a to 7d showing a modification example, employed is a light guide plate 40 which has a back face 42 provided with a great number micro-reflectors 60 like cylindrical-dents. The micro-reflectors 60 are disposed according to an arrangement pattern which is the same as that of the above-described embodiment (See FIG. 4), and there is a difference merely in micro-reflector shape.

An inner propagation light is represented by light beam P. In FIGS. 7a to 7d, coordinate O-XYZ is used to identify directions, matching with O-XY shown in FIG. 4 as to X-axis and Y-axis. A light path of one of the representative light beam P1 is illustrated in FIGS. 7b to 7d from +Z-direction, from +X-direction and from +Y-direction, respectively.

Figure 7A:
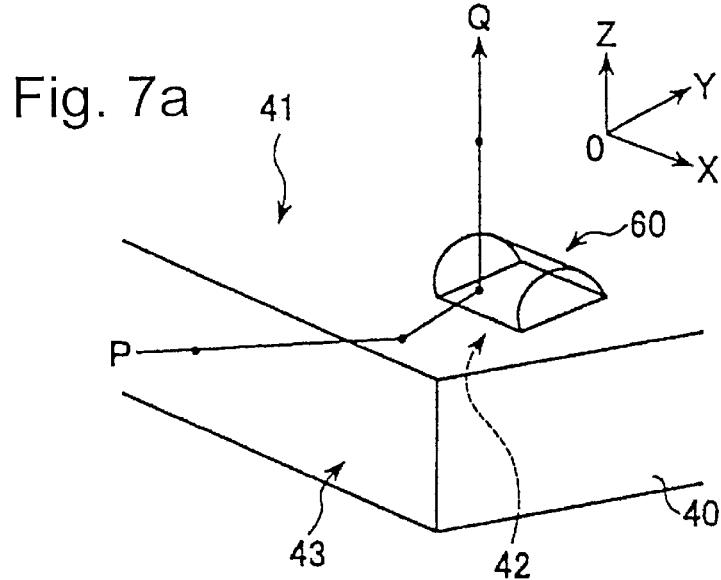
FIGS. 7a through 7c depict one of cylindrical-dent-like micro-reflectors formed on a modified example of light guide plate to illustrate direction-conversion of inner-propagation light, FIG. 7a being a perspective view, FIG. 7b being a view from +Z-direction, FIG. 7c being a view from +X-direction and FIG. 7d being a view from +Y-direction.
Figure 7B:
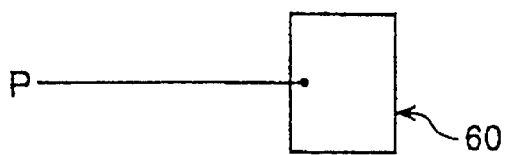
Figure 7C:
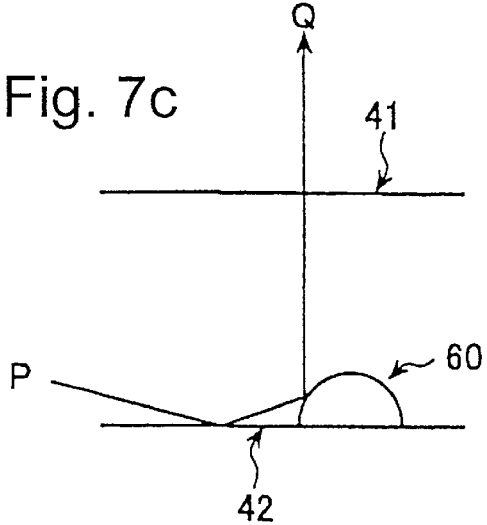
Figure 7D:
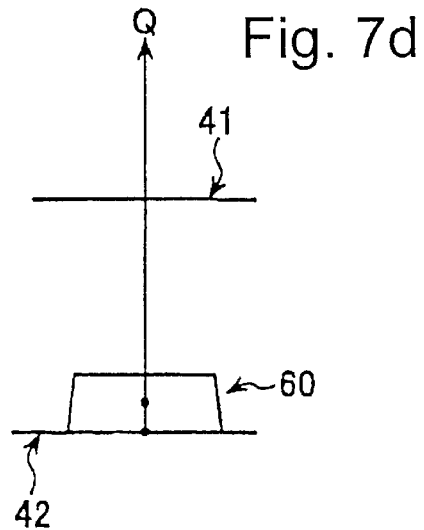

As illustrated in FIG. 7a and others, inner light beam P reaches a cylindrical face on the entrance side of the micro-reflector 60 directly from the incidence face 43 or after undergoing an inner reflection(s) at the emission face 41 or back face 42. Much of light reaching the cylindrical face is inner-reflected, with the result an inner propagation light proceeding toward the emission face 41 is produced.

This light is emitted from the emission face 41 to provide output light Q of the light guide plate 40, Such behavior of light will be understood better from FIGS. 7b to 7d illustrating the light path of representative light beam P from three directions.

Each micro-reflector 60 is orientated so that the cylindrical face es are directed toward the incidence face 43. If an orientation of each micro-reflector 60 is represented by a straight line crossing vertically with a valley bottom line of each cylindrical dent, it can be said that the straight line is directed to the incidence face 43. If such orientation manners are applied to a great number of micro-reflectors 60, the inner propagation light is advantageously and efficiently direction-converted as to be emitted.

In the next place, referring to FIGS. 8a to 8d showing a modification example, employed is a light guide plate 50 which has a back face 52 provided with a great number micro-reflectors 70 like laid triangular pole dents. The micro-reflectors 70 are disposed according to an arrangement pattern which is the same as that of the above-described embodiment (See FIG. 4), and there is a difference merely in micro-reflector shape.

An inner propagation light is represented by light beam P. In FIGS. 8a to 8d, coordinate O-XYZ is used to identify directions, matching with O-XY shown in FIG. 4 as to X-axis and Y-axis. A light path of one of the representative light beam P1 is illustrated in FIGS. 8b to 8d from +Z-direction, from +X-direction and from +Y-direction, respectively.

As illustrated in FIG. 8a and others, inner light beam P reaches a slope on the entrance side of the micro-reflector 70 directly from the incidence face 53 or after undergoing an inner reflection(s) at the emission face 51 or back face 52. Much of light reaching the slope is inner-reflected, with the result an inner propagation light proceeding toward the emission face 51 is produced.

This light is emitted from the emission face 41 to provide output light Q of the light guide plate 50, Such behavior of light will be understood better from FIGS. 8b to 8d illustrating the light path of representative light beam P from three directions.

Each micro-reflector 70 is orientated so that the cylindrical face es are directed toward the incidence face 43. If an orientation of each micro-reflector 70 is represented by a straight line crossing vertically with a valley bottom line of each laid triangular pole dent, it can be said that the straight line is directed to the incidence face 53. If such orientation manners are applied to a great number of micro-reflectors 70, the inner propagation light is advantageously and efficiently direction-converted as to be emitted.

In these two modifications, if an arrangement like that shown in FIG. 4 is employed, a very inconspicuous micro-reflector arrangement is obtained.

So far as reviewing the above-description, both sidewise intervals between micro-reflectors and longitudinal intervals between imaginary lines Ki and Ki+1 vary in order to meet the foresaid Conditions 2 and 4. However, this does not limit the scope of the present invention.

Figure 9:
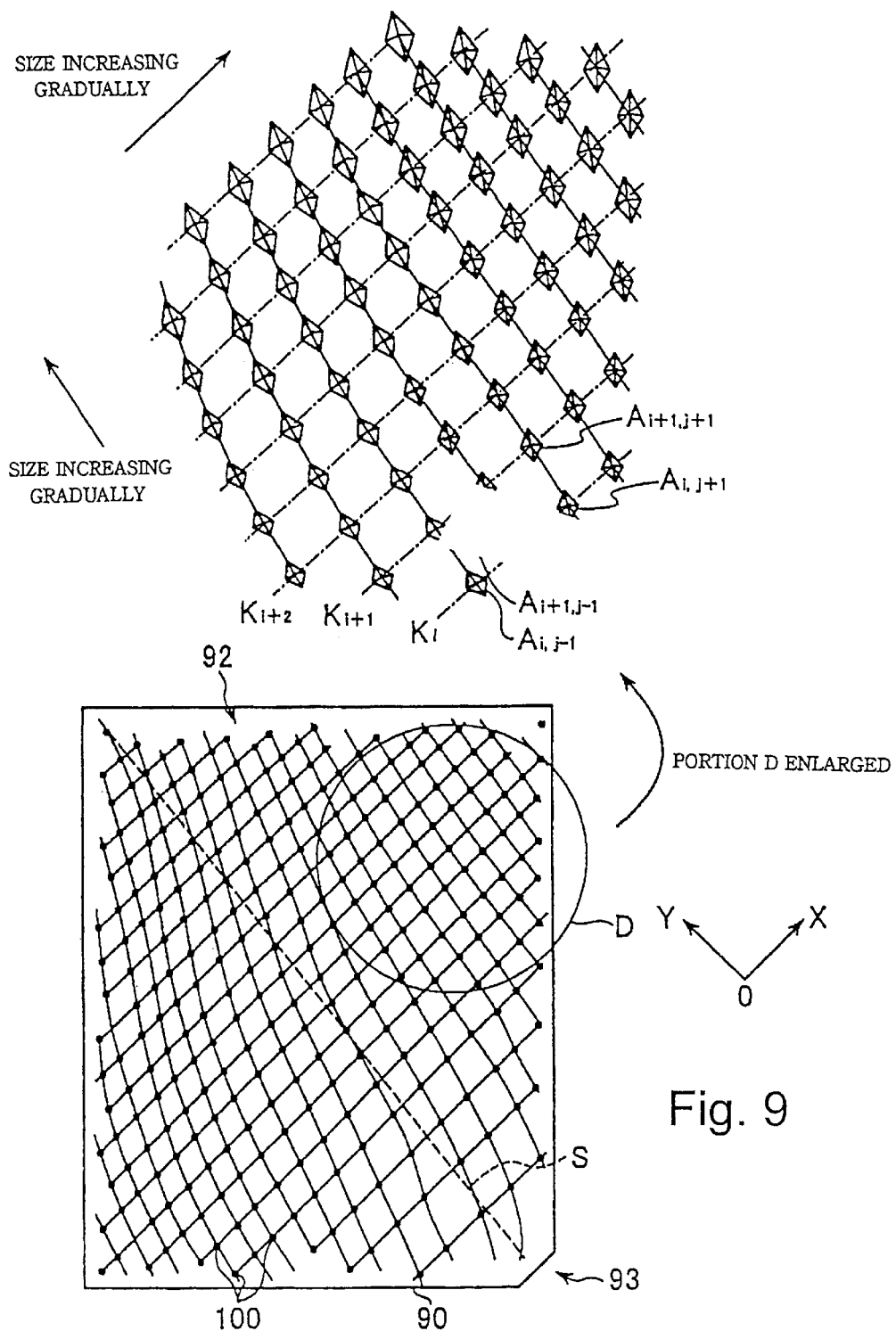
FIG. 9 is a micro-reflector array on a back face of a light guide plate employed in a modification with a partial enlarged illustration in and around circled portion D; and, FIG. 10 is a micro-reflector array on a back face of a light guide plate employed in another modification with a partial enlarged illustration in and around circled portion E.

According to the following example, micro-reflector size varies in order to meet the foresaid Conditions 2 and 4 as illustrated in FIG. 9.

The example employs a light guide plate 90 instead of the light guide plate 30 shown in FIG. 4. Referring to FIG. 9, the back face 92 of the light guide plate 90 is shown together with an enlarged partial illustration of circled portion D. As shown as dots in the illustration covering the whole back face at a left-lower part, a great number of micro-reflectors 100 are formed on the back face 92. Each micro-reflector 90 is configured like a projection projecting from a "general plane representing the back face 92".

Each micro-reflector 100 is shaped like a quadrangle pyramid, being allowed to be shaped otherwise as forementioned. Since a direction conversion function of each micro-reflector 100 is basically the same as that of each micro-reflector 20, repeated descriptions are omitted.

Since an orientation of each micro-reflector 100 is generally the same as that of each micro-reflector 20, repeated descriptions also are omitted.

The arrangement and size of the micro-reflectors 100 shall meet the forementioned Conditions 1 TO 4. It is noted, however, that Conditions 2-2 and 4-2 are selected for Conditions 2 and 4, respectively.

Condition 1; The great number of micro-reflectors 100 are arranged with sidewise intervals on many imaginary lines Ki (i=1,2,3 . . . ) which are separated with longitudinal intervals to each other and extend in directions generally perpendicular with respect to an imaginary reference line S that extends as to leave the incidence face 93.

Condition 2-2; Covering rate of the micro-reflectors on the back face per unit area tends to increase according to an increasing distance from the imaginary reference line S. For this, sizes of micro-reflectors tend to get larger, on each imaginary line Ki, according to an increasing distance from the imaginary reference line S.

Condition 3; When many micro-reflector trios are imaginatively composed of micro-reflectors arranged on successive three imaginary lines Ki, Ki+1, Ki+2 (i=1, 2, 3, 4 . . . ) so that each micro-reflector trio consists of three micro-reflectors which are located adjacent to each other and picked up one by one from every imaginary line Ki, Ki+1, Ki+2 and further so that each of approximately all of the micro-reflectors belong to only three trios of the many trios, the three micro-reflectors belonging to each of the many micro-reflector trios are located approximately on a straight line.

Condition 4-2; Covering rate of the micro-reflectors on the back face per unit area tends to increase according to an increasing distance from the incidence face. For this, sizes of micro-reflectors tend to get larger according to an increasing distance from the incidence face 93. Longitudinal intervals between successive imaginary lines Ki and Ki+1 are kept generally constant. It is noted, however, that somewhat larger intervals are adopted in the vicinity of the incidence face 93 as shown in FIG. 9.

Regarding Conditions 2-2, 3 and 4, additionally described by referring to a partially enlarged illustration in the upper right part of FIG. 9 as below. In the partially enlarged illustration, a labeling rule equivalent to that in the case of FIG. 4.

That is, label Ai,j is put on a micro-reflector 100, adopted as a reference micro-reflector, which is located on the i-th imaginary line Ki and at the j-th position counting from the reference line S toward the right-handed direction in FIG. 9, and labels Ai+1,j, Ai,j+1, Ai+1,j+1, Ai+2,j , Ai+2,j+1 ,Ai+2,j+2 . . . are put in order with respect to the reference micro-reflector Ai,j as illustrated.

Here, Conditions 2-2 and 4-2 are satisfied and, for example, sizes of micro-reflectors on the right side of the reference line S generally meet relations, size of Ai,j<Ai,j+1 and size of Ai,j<size of Ai+1,j.

And, trios as many as possible are imaginatively set such that each trio consists of three micro-reflectors having labels respectively including one common suffix for "j" and three successive suffixes for "i".

If each of generally all of the micro-reflectors, except for a very small number of exceptional micro-reflectors located in the vicinity of edges of the light guide plate 90, belongs to only three trios of the above many trios, the arrangement shown in FIG. 9 can be featured by that every set of three micro-reflectors Ap,q, Ap+1,q, Ap+2,q belonging to any trio are located approximately on a straight line.

This Condition 3 is applied together with Conditions 1, 2-2 and 4-2, providing a distribution of micro-reflectors 100 according to a grid pattern having covering rate varying gradually in both directions along the reference line S and crossing the same.

It is specifically important in comparison with the prior art (See FIG. 2) particular that Condition 2 (or 2-2) enables the micro-reflector arrangement to be inconspicuous in combination with the other Conditions 1, 3 and 4, as mentioned previously.

As fore-mentioned, the above-mentioned prior art example does not meet Conditions 2 (or 2-2) while meeting Conditions 1, 3 and 4.

As a result, the prior art (See FIGS. 2a and 2b) can not provide a "grid pattern having covering rate varying gradually in both directions extending from the incidence face (Note: corresponding to the reference line S in FIG. 9) and crossing the same.

In other words, it is inevitable as mentioned previously that oblique aligning lines, which extend approximately in parallel at a "constant size or constant covering rate" in a considerable wide area (generally across the width of the light guide plate). According to researches by the instant inventor, if such "regularity of repeated arrangement of equal-sized micro-reflectors or equal-covering-rate of micro-reflectors" exists in a large area, conspicuous and unnatural stripe-like pattern is apt to appear.

To the contrary, in the case shown in FIG. 9 provided with a feature of the present invention, although "oblique aligning lines" (lines drawn to trace micro-reflectors having the same suffix j) are produced, covering rate of micro-reflectors varies according to an increasing distance from the imaginary reference line S to the right and left hand because the above Condition 2 (2-2) is required.

Thus "regularity of repetition of constant covering rate and constant sidewise interval" is avoided from extending over a wide area, with the result unnatural stripe-like pattern is prevented from being conspicuous.

In such ways, covering rate of micro-reflectors can be changed by changing sizes.

Although not illustrated specifically, covering rate of micro-reflectors can be changed by adopting size changing together with changing of longitudinal and/or sidewise intervals.

In the next place, the imaginary lines K1, K2, K3 . . . are additionally described as below. Although the imaginary lines Ki employed in the above embodiments are straight lines, this does not limit the scope of the present invention.

That is, imaginary lines Ki may be curved gently so far as they are drawn as to extend in directions generally perpendicular with respect to an imaginary reference line S and are separated as to have intervals tending to get smaller according to an increasing distance from an incidence face.

Figure 10:
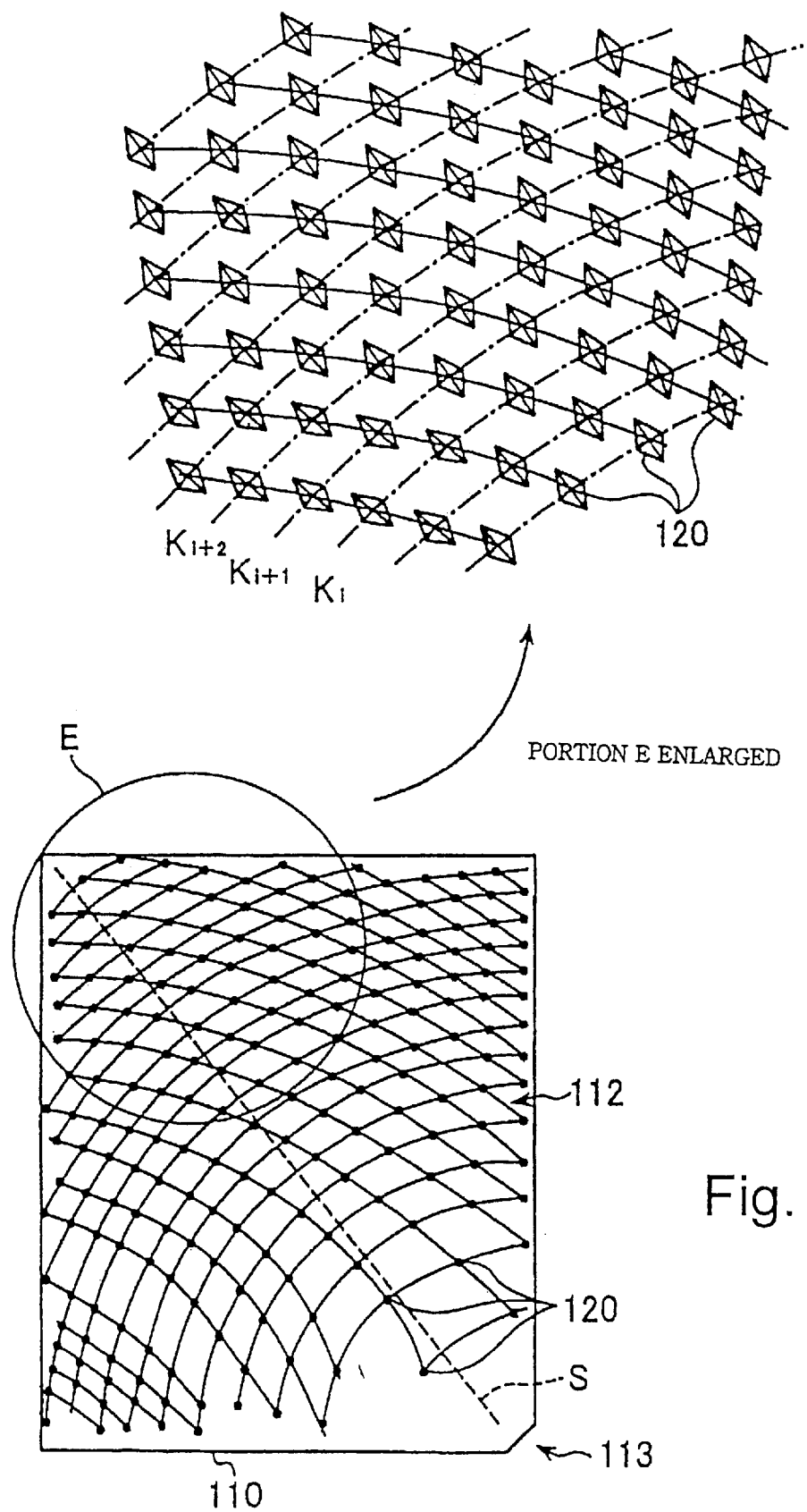

FIG. 10 shows an example adopting gently curved arc-like imaginary lines Ki. In this example, a light guide plate 110 is employed instead of the light guide plates 30, 90 shown in FIGS. 4 and 9.

Referring to the illustration, the back face 112 of the light guide plate 110 is shown together with an enlarged partial illustration of circled portion E. As shown as dots in the illustration covering the whole back face at a left-lower part, a great number of micro-reflectors 120 are formed on the back face 112.

Each micro-reflector 120 is configured like a projection projecting from a "general plane representing the back face 112".

Each micro-reflector 120 is shaped like a quadrangle pyramid, being allowed to be shaped otherwise as forementioned. Since a direction conversion function of each micro-reflector 120 is basically the same as that of each micro-reflector 20 or 100, repeated descriptions are omitted.

Since other factors such as conditions of micro-reflector arrangement and micro-reflector size are the same as compared with the example shown in FIG. 4 except that the imaginary lines are curved like gentle arcs, repeated and detailed descriptions also are omitted. This example also avoids an unnatural pattern from being observed.

Figure 1A:
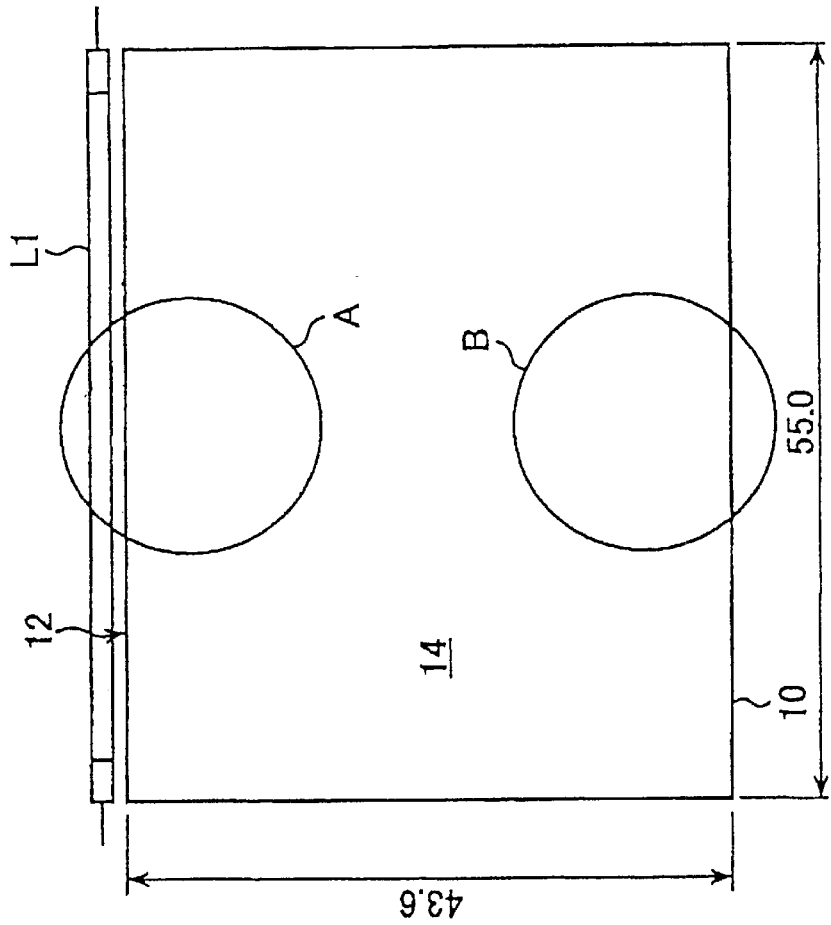
Figure 1B:
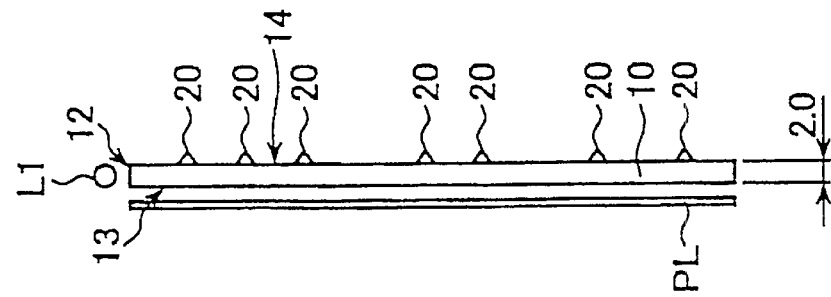

Although the above embodiments set each incidence face at an corner portion, the present invention can be applied to light guide plates of a type (as shown in FIG. 1) such that an incidence face is set at a side end face.

If so applied, a reference line S can be drawn as to extend from a generally center of the side end face providing the incidence face in a direction approximately vertical to the incidence face. In general, a reference line S is preferably drawn as to divide a back face of a light guide plate into approximately equal two parts.

It is noted, however, the type setting an incidence face at a side end face is apt to have local or exceptional area at corner portions in which brightness is not enough to high.

To deal with this exceptional area, modifying means (such as additional arrangement of micro-reflectors) may be applied so far as the feature (inconspicuousness) of the arrangements determined according to the above-described rules is maintained.

According to the present invention, provided is a light guide plate improved so that micro-reflector arrangement formed on a back face is inconspicuous. And an improved illumination quality or display quality is realized by employing the light guide plate in a surface light source device or liquid crystal display.

What is claimed is:

1. A light guide plate, which is supplied with light from a primary light source, comprising an emission face for light-outputting, a back face opposite with said emission face and an incidence face for light-inputting, wherein said back face is provided with a great number of micro-reflectors for light-proceeding-direction-conversion, said great number of micro-reflectors are arranged with sidewise intervals on many imaginary lines K1, K2, K3 . . . which are separated with longitudinal intervals to each other and extend in directions generally perpendicular with respect to an imaginary reference line S that extends as to leave said incidence face, and, when many micro-reflector trios are imaginatively composed of micro-reflectors arranged on successive three imaginary lines Ki, Ki+1, Ki+2 (i=1, 2, 3, 4 . . . ) so that each micro-reflector trio consists of three micro-reflectors which are located adjacent to each other and picked up one by one from every imaginary line Ki, Ki+1, Ki+2 and further so that each of approximately all of said micro-reflectors belongs to only three trios of said many trios, said three micro-reflectors belonging to each of said many micro-reflector trios are located approximately on a straight line, and, covering rate of said micro-reflectors on said back face per unit area tends to increase according to an increasing distance from said incidence face and to increase according to an increasing distance from said imaginary reference line S.

2. A light guide plate as defined in claim 1, wherein said great number of micro-reflectors are generally the same in size.

3. A light guide plate as defined in claim 1 or 2, wherein said incidence face is located at a corner portion of said light guide plate.

4. A light guide plate as defined in claim 1, 2 or 3, wherein said great number of micro-reflectors are shaped like quadrangle pyramid-projections.

5. A light guide plate as defined in claim 1, 2 or 3, wherein said great number of micro-reflectors are shaped like cylindrical dents.

6. A light guide plate as defined in claim 1, 2 or 3, wherein said great number of micro-reflectors are like V-shaped dents.

7. A surface light source device comprising a primary light source and a light guide plate which introduces light through an incidence face to emit light through an emission face, said light guide plate having a back face opposite with said emission face and said incidence face for light-inputting, wherein said back face is provided with a great number of micro-reflectors for light-proceeding-direction-conversion, said great number of micro-reflectors are arranged with sidewise intervals on many imaginary lines K1, K2, K3 . . . which are separated with longitudinal intervals to each other and extend in directions generally perpendicular with respect to an imaginary reference line S that extends as to leave said incidence face, and, when many micro-reflector trios are imaginatively composed of micro-reflectors arranged on successive three imaginary lines Ki, Ki+1, Ki+2 (i=1, 2, 3, 4 . . . ) so that each micro-reflector trio consists of three micro-reflectors which are located adjacent to each other and picked up one by one from every imaginary line Ki, Ki+1, Ki+2 and further so that each of approximately all of said micro-reflectors belongs to only three trios of said many trios, said three micro-reflectors belonging to each of said many micro-reflector trios are located approximately on a straight line, and, covering rate of said micro-reflectors on said back face per unit area tends to increase according to an increasing distance from said incidence face and to increase according to an increasing distance from said imaginary reference line S.

8. A surface light source device as defined in claim 7, wherein said great number of micro-reflectors are generally the same in size.

9. A surface light source device as defined in claim 7 or 8, wherein said incidence face is located at a corner portion of said light guide plate.

10. A surface light source device as defined in claim 7, 8 or 9, wherein said great number of micro-reflectors are shaped like quadrangle pyramid-projections.

11. A surface light source device as defined in claim 7, 8 or 9, wherein said great number of micro-reflectors are shaped like cylindrical dents.

12. A surface light source device as defined in claim 7, 8 or 9, wherein said great number of micro-reflectors are like V-shaped dents.

13. A liquid crystal display comprising a liquid crystal display panel and a surface light source device for illuminating said liquid crystal display panel:

said surface light source device comprising a primary light source and a light guide plate which introduces light through an incidence face to emit light through an emission face, said light guide plate having a back face opposite with said emission face and said incidence face for light-inputting, wherein said back face is provided with a great number of micro-reflectors for light-proceeding-direction-conversion, said great number of micro-reflectors are arranged with sidewise intervals on many imaginary lines K1, K2, K3 . . . which are separated with longitudinal intervals to each other and extend in directions generally perpendicular with respect to an imaginary reference line S that extends as to leave said incidence face, and, when many micro-reflector trios are imaginatively composed of micro-reflectors arranged on successive three imaginary lines Ki, Ki+1, Ki+2 (i=1, 2, 3, 4 . . . ) so that each micro-reflector trio consists of three micro-reflectors which are located adjacent to each other and picked up one by one from every imaginary line Ki, Ki+1, Ki+2 and further so that each of approximately all of said micro-reflectors belongs to only three trios of said many trios, said three micro-reflectors belonging to each of said many micro-reflector trios are located approximately on a straight line, and, covering rate of said micro-reflectors on said back face per unit area tends to increase according to an increasing distance from said incidence face and to increase according to an increasing distance from said imaginary reference line S.

14. A liquid crystal display as defined in claim 13, wherein said great number of micro-reflectors are generally the same in size.

15. A liquid crystal display as defined in claim 13 or 14, wherein said incidence face is located at a corner portion of said light guide plate.

16. A liquid crystal display as defined in claim 13, 14 or 15, wherein said great number of micro-reflectors are shaped like quadrangle pyramid-projections.

17. A liquid crystal display as defined in claim 13, 14 or 15, wherein said great number of micro-reflectors are shaped like cylindrical dents.

18. A surface light source device as defined in claim 13, 14 or 15, wherein said great number of micro-reflectors are like V-shaped dents.

* * * * *